United States Patent
Banga et al.

(10) Patent No.: US 9,015,836 B2
(45) Date of Patent: *Apr. 21, 2015

(54) SECURING FILE TRUST WITH FILE FORMAT CONVERSIONS

(71) Applicant: Bromium, Inc., Cupertino, CA (US)

(72) Inventors: Gaurav Banga, Cupertino, CA (US); Rahul Kashyap, Foster City, CA (US); Andrew Southgate, Cambridge (GB)

(73) Assignee: Bromium, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/194,747

(22) Filed: Mar. 2, 2014

(65) Prior Publication Data

US 2014/0259159 A1 Sep. 11, 2014

Related U.S. Application Data

(63) Continuation of application No. 13/419,356, filed on Mar. 13, 2012, now Pat. No. 8,667,594.

(51) Int. Cl.
 *G06F 21/56* (2013.01)
(52) U.S. Cl.
 CPC .............. *G06F 21/568* (2013.01); *G06F 21/56* (2013.01)
(58) Field of Classification Search
 CPC ..................................................... G06F 21/568
 See application file for complete search history.

(56) References Cited

U.S. PATENT DOCUMENTS

| | | | |
|---|---|---|---|
| 5,778,173 A | 7/1998 | Apte | |
| 6,108,799 A | 8/2000 | Boulay et al. | |
| 6,697,950 B1 | 2/2004 | Ko | |
| 7,996,834 B2 | 8/2011 | Araujo, Jr. et al. | |
| 8,391,494 B1 | 3/2013 | Serenyi | |
| 8,392,993 B1 | 3/2013 | Oliver | |
| 8,590,016 B2 | 11/2013 | Kim et al. | |
| 8,752,047 B2 | 6/2014 | Banga et al. | |
| 8,776,240 B1 | 7/2014 | Wu et al. | |
| 2003/0070089 A1 | 4/2003 | Fu et al. | |
| 2003/0182475 A1 | 9/2003 | Gimenez | |
| 2003/0204569 A1 | 10/2003 | Andrews et al. | |
| 2005/0021994 A1 | 1/2005 | Barton et al. | |
| 2005/0188272 A1 | 8/2005 | Bodorin et al. | |
| 2005/0273866 A1 | 12/2005 | Brown et al. | |
| 2006/0021029 A1 | 1/2006 | Brickell et al. | |
| 2006/0136910 A1 | 6/2006 | Brickell et al. | |
| 2007/0150956 A1* | 6/2007 | Sharma et al. | 726/24 |
| 2007/0157307 A1 | 7/2007 | Katoh et al. | |
| 2007/0180528 A1 | 8/2007 | Kane | |
| 2007/0192329 A1 | 8/2007 | Croft et al. | |

(Continued)

*Primary Examiner* — Gilberto Barron, Jr.
*Assistant Examiner* — Malcolm Cribbs
(74) *Attorney, Agent, or Firm* — Brokaw Patent Law PC; Christopher J. Brokaw (57) ABSTRACT

Approaches for ensuring a digital file does not contain malicious code. A digital file in an original format may or may not contain malicious code. An intermediate copy of the digital file in an intermediate format is created from the digital file in the original format. The intermediate format preserves a visual or audio presentation of the digital file without supporting metadata or file format data structures of the original format. A sterilized copy of the digital file is created from the intermediate copy. The sterilized copy is in the original format. The sterilized copy comprises a digital signature indicating that the sterilized copy has been converted from the intermediate format to the original format. Advantageously, the sterilized copy is guaranteed to not possess any malicious code.

21 Claims, 4 Drawing Sheets

(56) References Cited

U.S. PATENT DOCUMENTS

| | | |
|---|---|---|
| 2008/0086779 A1 | 4/2008 | Blake et al. |
| 2008/0148400 A1 | 6/2008 | Barron et al. |
| 2008/0209138 A1 | 8/2008 | Sheldon et al. |
| 2008/0209551 A1 | 8/2008 | Treacy et al. |
| 2008/0320590 A1 | 12/2008 | Craft et al. |
| 2009/0307774 A1 | 12/2009 | Shimizu |
| 2009/0328221 A1 | 12/2009 | Blumfield et al. |
| 2010/0064369 A1 | 3/2010 | Stolfo et al. |
| 2010/0251388 A1 | 9/2010 | Dorfman |
| 2012/0089650 A1 | 4/2012 | Gibbs et al. |
| 2012/0167204 A1 | 6/2012 | Akka |
| 2012/0255014 A1 | 10/2012 | Sallam |
| 2013/0091570 A1 | 4/2013 | McCorkendale et al. |
| 2013/0288647 A1 | 10/2013 | Turgeman |
| 2014/0068756 A1 | 3/2014 | Dorfman |
| 2014/0143825 A1 | 5/2014 | Behrendt et al. |
| 2014/0201525 A1 | 7/2014 | Korthny et al. |

* cited by examiner

SECURING FILE TRUST WITH FILE FORMAT CONVERSIONS

CLAIM OF PRIORITY

This application claims priority to, and is a continuation of, U.S. Pat. No. 8,667,594, filed Mar. 13, 2012, titled "Securing File Trust with File Format Conversions," the entire disclosure of which is incorporated by reference for all purposes as if fully set forth herein.

FIELD OF THE INVENTION

Embodiments of the invention relate to ensuring a digital file does not contain any malicious code.

BACKGROUND

Ensuring the security of Internet users and Internet connected devices is one of the grand challenges facing us today. The current state of affairs is very problematic, as our cyber-security infrastructure is easily and routinely subverted by cyber criminals, resulting in great economic loss. Every year brings deeper and more complex dependence by society on our cyber-infrastructure, and yet at the same time the cyber-security problem only worsens as the capabilities of the cyber-criminal mature. In effect, we are building mission-critical dependence into virtually every aspect of human activities on a cyber-infrastructure that is very insecure at its core.

The prevailing school of thought on how to protect cyber-infrastructures places great emphasis on the detection of security vulnerabilities to anticipate how an attack will take place. Once a vulnerability is detected, countermeasures are enacted. This philosophy extends to how viruses and other potentially malicious digital files are handled. Presently, there are a variety of techniques for scanning digital files to determine whether any portion of the digital file matches a signature associated with a known virus or malicious code. Once identified, such dangerous files are quarantined and appropriate security measures taken. Unfortunately, due to an increase in exploitation of file format vulnerabilities, attacks that exploit relatively unknown vulnerabilities are becoming more common.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for ensuring a digital file does not contain malicious code are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Using File Format Conversion to Secure File Trust

Embodiments of the invention prevent the spread of malicious code using a fundamentally different paradigm than prior approaches. In the past, the security of a computer system or network rested upon ensuring that malicious code could be identified and subsequently contained. Rather than attempting to identify malicious code, embodiments assume that any digital file may potentially carry malicious code. Any digital file entering a secure area is processed to remove any malicious code carried therein, thereby allowing the digital file to be trusted within the secure area. After processing a digital file to ensure that any malicious code therein is removed, the digital file may be branded with a signature or the like so that the digital file's trustworthiness is verifiable to consumers of the digital file within an enterprise.

Embodiments of the invention operate under the observation that malicious code hiding within a digital file is designed to exploit file format vulnerabilities. For example, often malicious code is carried by a digital file that the user is tricked into opening. When such a file is opened, the code contained therein is allowed to execute, which opens the door for the malicious code to spread or otherwise achieve its nefarious objective. Embodiments of the invention remove any malicious code carried by a digital file by converting the digital file to a different file format so that any metadata or data structures of the original file format which may have carried the malicious code are removed. Converting the digital file to a different file format in this fashion still preserves how the digital file is visually and/or audibly perceived by a user.

Figure 1:
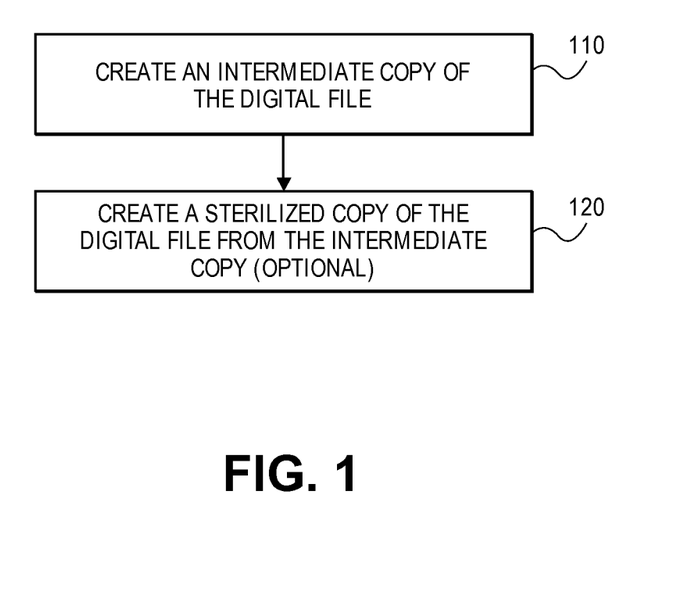
FIG. 1 is a flowchart illustrating the functional steps of ensuring a digital file does not contain malicious code according to an embodiment of the invention.

FIG. 1 is a flowchart illustrating the functional steps of ensuring a digital file does not contain malicious code according to an embodiment of the invention. As shall be explained in further detail below, the steps of FIG. 1 may be performed on a digital file by a variety of different entities in a variety of different contexts. Generally speaking, the steps of FIG. 1 may be performed when a digital file enters a secure area (such as a computer network, a device, or domain) or when the digital file is selected or opened by any party, be it a user or a computerized entity.

In step 110 of FIG. 1, a copy (termed the "intermediate copy") of an original digital file is created. The intermediate copy is in a different file format than the original digital file. The intermediate copy will represent the same type of content as the original digital file. For example, if the original digital file is a visual presentation, an audio presentation, or a video, then the intermediate copy will also be a visual presentation, an audio presentation, or a video respectively.

To provide a concrete example, if the original digital file is an Adobe Acrobat document (i.e., the digital file has a ".pdf" extension), then the intermediate copy may be a JPEG image file (i.e., the digital file has a ".jpeg" extension). Both an Adobe Acrobat document and a JPEG image file may be used to describe how to visually represent a document or image, but do so using different file formats. Thus, the same visual presentation may be represented as both an Adobe Acrobat document and a JPEG document. Similarly, if the original digital file is an audio presentation (such as a digital file with a ".mp3" extension) or in a video format (such as a digital file with a ".avi" extension), the intermediate copy will also be an audio presentation or in a video format respectively.

In an embodiment, in step 110 multiple intermediate files may be created to represent a single original digital file. To illustrate, assume that the original digital file in step 110 is a three page Adobe Acrobat document and further assume that the three page Adobe Acrobat document is to be converted into a JPEG intermediate file format in step 110. In performing step 110 in this example, the three page Adobe Acrobat document may be converted into a collection of JPEG files, each of which is an image corresponding to a different page of the Adobe Acrobat document.

In addition to the collection of JPEG files representing the pages of the Adobe Acrobat document, metadata information which contains a mapping of which JPEG file corresponds to which page of the original Adobe Acrobat document may also be created in step 110. This metadata information may be represented in a variety of different ways. This metadata information may reside in a separate file. Alternately, the metadata information may be a convention that employs the metadata capabilities of the file system itself. As an example, a five page Adobe Acrobat document called foo.PDF may be converted to a folder (or compressed folder file—foo.zip) which contains files foo__001.jpg, foo__002.jpg, . . . foo__005.jpg. Using this metadata information, one or more intermediate files created in step 110 may subsequently be combined together to form a single file, such as a JPEG image that has all the pages cascaded together into one gigantic image or a ZIP file containing a folder of all the JPEG image files created in step 110.

For clarity, examples and discussion will be presented herein as an intermediate copy being created in step 110. However, in view of the above discussion, those in the art shall recognize that one or more intermediate copies may be created in step 110 or a single intermediate copy created in step 110 may represent multiple files in the intermediate file format or the original file format in step 110.

The purpose of creating an intermediate copy in a different file format (referred to as the "intermediate format") than the original file format is to preserve how the digital file is visually or audibly perceived when rendered or played in the intermediate format without the intermediate format supporting the metadata or file format data structures of the original file format. To illustrate using the above example involving an original format of a ".pdf" document and an intermediate format of a JPEG image, the intermediate copy expressed in a JPEG image file format should have the same visual appearance as the original Adobe Acrobat document, but the intermediate copy lacks the metadata and data structures inherent within the original Adobe Acrobat document. Thus, any malicious code contained within the original Adobe Acrobat document would not be carried forward into the intermediate copy expressed as a JPEG image, as such malicious code would be lost in translation.

It is noted that there would not necessarily be a reduction in resolution or quality between the original digital file and the intermediate copy. In fact, in many cases resolution and quality can actually be improved in the intermediate copy.

The particular intermediate format used should be the file format which provides the highest resolution and/or quality in the least amount of physical space. Naturally, there may be a correlation between the size of a digital file and its resolution and/or quality, and so an intermediate format should be selected for use in step 110 which satisfies both criteria to an acceptable level. Embodiments of the invention would enable a user to customize into which particular intermediate format each digital file format will be converted. In an embodiment, the particular intermediate format used should be one that is relatively simple (for example, the .JPEG image file format) such that the likelihood of a bug in software that handles the intermediate file format is low because the intermediate format employed is simple to parse.

An intermediate copy in an intermediate format may be created using a software conversion program that converts a digital file from one file format to another. In effect, such a conversion program serializes the original digital file into the intermediate format. Thus, the intermediate format may be a serialized representation of the digital file. Such conversion programs are generally available for all common file formats. The inventors note that propriety file formats can be supported by embodiments through the use of custom conversion programs. Accordingly, embodiments have no limits on the types of digital files which may be converted into or expressed as intermediate copies in step 110.

The creation of the intermediate file in step 110, as well as the creation of the sterilized file in step 120 explained in detail below, may be performed in the background in a manner transparent to the user. For example, the steps of FIG. 1 may be performed automatically (i.e., without the request or knowledge of the user) whenever a user clicks or selects a file, the user receives an email, or whenever the user receives a file from outside a trusted domain (such as anytime the user receives a file over the Internet). In this way, in certain embodiments, the user experience of embodiments should not deviate from the expected behavior of the user's system.

In step 120, a sterilized copy of the digital file is created from the intermediate copy. The sterilized copy is a copy of the intermediate file that has been converted back into the original file format.

Note that the performance of step 120 is optional, as certain embodiments may only perform step 110 and not perform step 120. To illustrate a use case where step 120 is not performed, if a user simply wishes to view a digital file using an application, then the user may not care in which digital file format the digital file is represented in, and step 120 need not be performed. The application can safely use the intermediate copy created in step 110 to render a visual presentation to display to the user.

However, the inventors anticipate that most embodiments will perform step 120, as the sterilized copy is in the same file format as the original digital file, which is the file format that the user expects to interact. Accordingly, to provide a seamless user experience and an extra assurance of protection, step 120 will typically be performed.

The performance of step 120 does provide an extra assurance of protection, as the conversion of the intermediate copy in the intermediate format into the sterilized copy in the original file format will also remove metadata and data structures inherent in the intermediate file format form the sterilized copy.

The sterilized copy may be created in step 120 using a similar software conversion program such as discussed above with reference to step 110. In effect, the conversion program in step 120 deserializes the intermediate copy into the sterilized copy in the original file format.

In an embodiment, the sterilized copy may comprise a digital signature indicating that the sterilized copy has been converted from the intermediate format to the original format.

In this way, when the sterilized copy is shared across the organization, other recipients or consumers of the sterilized copy may determine that the sterilized copy can be trusted by verifying the presence of the digital signature within the sterilized copy. The digital signature may be implemented using a variety of different mechanisms. To illustrate an example, in the performance of step 120, a SHA-1 or MD5 hash of the sterilized copy or the original digital file may be inserted into the sterilized copy. As long as the sterilized copy is not edited after being branded with the digital signature, the sterilized copy may be considered "safe" and "trustworthy" by entities within an organization.

Embodiments may be Implemented in Numerous Ways

The steps of FIG. 1 may be performed by a variety of different entities and at a variety of different locations. To illustrate, consider FIG. 2, which is a diagram of various locations within a computer network where the steps of FIG. 1 may be performed according to an embodiment of the invention. The steps of FIG. 1 may be performed by any entity or device that is capable of buffering an entire digital file. The steps of FIG. 1 may be performed anytime a digital file enters trusted domain 210 or by any device within trusted domain 210. For example, anytime a digital file is retrieved from the Internet, edge router 220 may perform the steps of FIG. 1 on the digital file. Alternately, mail gateway 222 may perform the steps of FIG. 1 on any attachment to an email received by mail gateway 222. The steps of FIG. 1 can be implemented in any network inspection device, such as a mail gateway, or any other device capable of MIME decoding of email attachments and downloads.

Figure 2:
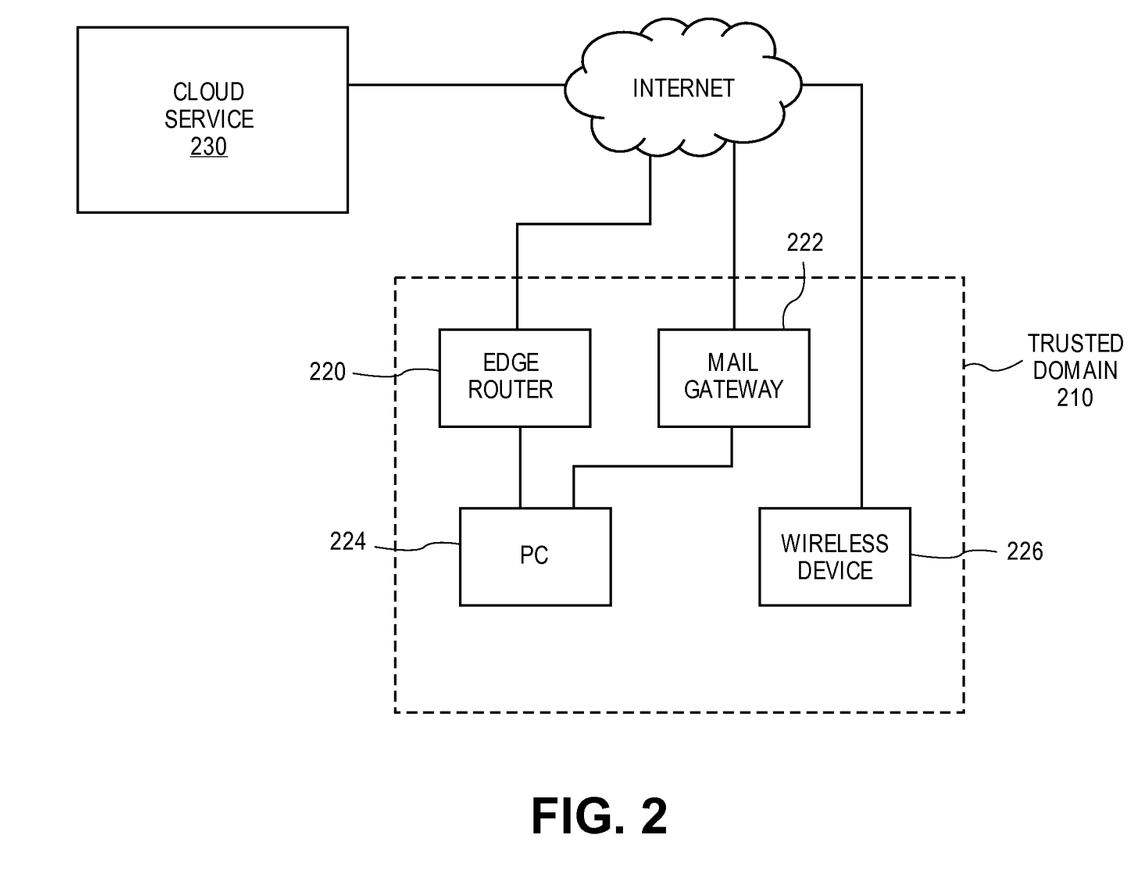
FIG. 2 is a diagram of various locations within a computer network where the steps of FIG. 1 may be performed according to an embodiment of the invention.

The steps of FIG. 1 may also be performed by cloud service 230, which is a remote service accessible by devices within trusted domain 210. For example, a user may instruct wireless device 226 (which may be a tablet PC or cell phone) to contact cloud service 230 to request that cloud service 230 perform the steps of FIG. 1 on a set of one or more digital files identified by the user.

In an embodiment, the steps of FIG. 1 may be performed at PC 224 either automatically or in response to a variety of different user actions. To illustrate, in an embodiment, when a user selects a digital file (for example, via a right mouse click), the user may be presented with an option to choose whether he or she would like to execute the digital file within a virtual machine or perform the steps of FIG. 1 on the digital file before executing, rendering, or playing the digital file on the host operating system.

As the performance of step 110 of FIG. 1 may be prone to attack by malware (as this step converts a potentially malicious digital file into a safe file format), embodiments may perform step 110 and/or step 120 of FIG. 1 in a virtual machine created from a state known to be safe. After the performance of step 110 which produces a safe intermediate file, the safe intermediate file may be safely extracted from the temporary virtual machine and the temporary virtual machine may be discarded.

In an embodiment, the temporary virtual machines in which one or more of steps 110 and 120 of FIG. 1 are performed correspond to the UCVMs discussed in U.S. patent application Ser. No. 13/115,354, filed on May 25, 2011, entitled "Approaches for Securing an Internet Endpoint Using Fine-Grained Operating System Virtualization," which is incorporated by reference for all purposes as if fully set forth herein. Additional discussion regarding the use of virtual machines with reference to the steps of FIG. 1 will be presented below in the section entitled "Implementation With Virtual Machines."

Embodiments of the invention may perform the steps of FIG. 1 automatically (i.e., without receiving a user request or informing the user) in certain contexts. To illustrate, certain embodiments may automatically perform the steps of FIG. 1 on any digital file that is migrated from a virtualized environment to the desktop or a server. As another example, certain embodiments may automatically perform the steps of FIG. 1 on any attachment to an email client (like Microsoft Outlook) that is opened by a user.

The steps of FIG. 1 may also be performed by any software component within trusted domain 210 that interacts with a digital file which does not contain a digital signature indicating that it has previously been sterilized. For example, such a software component may correspond to software executing on an edge router, an email server, an email client, a web browser, or any software responsible for managing the instantiation and de-instantiation of one or more virtual machines. In an embodiment, a web browser may be configured with a plug-in which causes the web browser to perform the steps of FIG. 1 on any digital file downloaded from the Internet.

The steps of FIG. 1 may also be performed on a specialized custom hardware device, such as one that employs custom application specific integrated circuits (ASICs), to perform one or more of the steps of FIG. 1 without the use of any software.

Processing Digital Files that Contain Macros and Scripts

Figure 3:
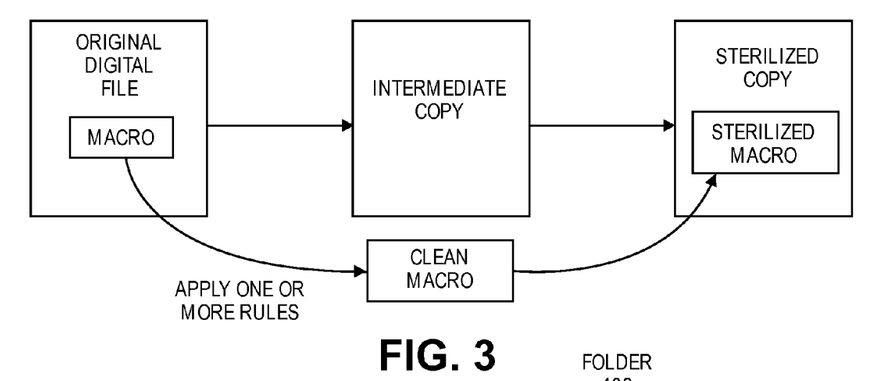
FIG. 3 is an illustration of processing dynamic content within a digital file according to an embodiment of the invention.

Certain digital files may contain dynamic content, such as a macro or a script. For example, an Excel spreadsheet may contain an embedded Visual Basic (VB) script. Embodiments of the invention may be designed to analyze such dynamic content to determine if it is safe, and may include any dynamic deemed safe in the sterilized copy created in step 120. FIG. 3 is an illustration of processing dynamic content within a digital file according to an embodiment of the invention. While FIG. 3 makes reference to the dynamic content being a macro, the techniques discussed herein may be applied for use with any type of dynamic content.

As depicted in FIG. 3, a macro is removed from the digital file in the original format in step 210. The macro may be examined to determine whether the macro conforms to one or more rules. The purpose of the one or more rules is to ensure that only dynamic content deemed safe is migrated to the sterilized copy in step 120. Dynamic content that is deemed safe (i.e., no malicious or problematic content is contained therein) may be inserted into the sterilized copy created in step 120. As shall be explained in further detail below, actions performed in the performance of processing dynamic content to ensure that it is safe and migrating the safe dynamic content into the sterilized copy in step 120 may be, but need not be, performed in a virtual machine or in a UCVM.

In embodiments, the processing of dynamic content within a digital file to ensure that the dynamic content is deemed safe may only be possible when the intermediate format is such that the sterilized dynamic content may be properly combined with the sterilized file in step 120. For example, to assist the combination of the sterilized dynamic content and the sterilized file, a digital file with a .doc extension may need to be converted into a .doc which has all macros removed by a special convertor, and thereafter any macros deemed safe may be added to the sanitized copy of the digital file.

The one or more rules used to examine dynamic content may be arbitrarily complex. An example of a rule is that macros are permissible as long as they are not named as a function. Another example of a rule is that no linked files are allowed.

Rules can be used to disable problematic features. For example, there may be a certain feature that represents a security issue, and any digital file is deemed untrustworthy if in possession of this feature. A rule could be designed to remove the problematic feature from the dynamic content so that the remainder of the dynamic content may be migrated to the sterilized copy in step 120 without the problematic feature. In this way, a digital file can have the problematic feature and be considered untrustworthy or may have the problematic feature removed to be considered trustworthy.

As another example, a rule could be designed such that only sterilized copies of digital files are considered trustworthy. Alternately or additionally, a rule could state that only certain types of files (such as spreadsheets) need be processed using the steps of FIG. 1 to be considered trustworthy. A rule may also state what type of intermediate format a particular file format should be converted into in step 110. For example, a rule could state that all image files should be converted into a ".png" file format and be considered trustworthy, but that a digital file in the ".jpeg" file format should not be trusted.

If a portion of a macro is identified which does not conform to a rule, that portion of the macro may be revised to conform the macro to the rule to produce a sterilized macro. For example, if the name of a macro does not conform to a rule, then the name of the macro may be revised in accordance with the rule, and the revised macro may be inserted back into the sterilized copy in step 120.

In an alternate embodiment, after determining that the macro does not conform to a rule, the macro may not be inserted into the sterilized copy in step 120, thereby causing the macro to be removed from the sterilized copy.

The rules discussed herein in this section may be used in conjunction with or correspond to those policies discussed in U.S. patent application Ser. No. 13/419,345, entitled "Seamless Management of Untrusted Data Using Virtual Machines," filed on Mar. 13, 2012, invented by Gaurav Banga et al., the contents of which are hereby incorporated by reference for all purposes as if fully set forth herein.

Maintaining the Original and Sterilized File within a File System

After the performance of the steps of FIG. 1, the original digital file in the original format may be maintained in association with the sterilized copy of the digital file. For example, if a user stores a copy of the sterilized copy of the digital file in a folder of a file system, then the original digital file may also be stored in the same folder. This is so as to accommodate the performance of a merge-edit operation, which will be discussed below. In an embodiment, the original digital file and the sterilized copy of the digital file may be stored together, and perhaps may be organized as a tuple.

Figure 4:
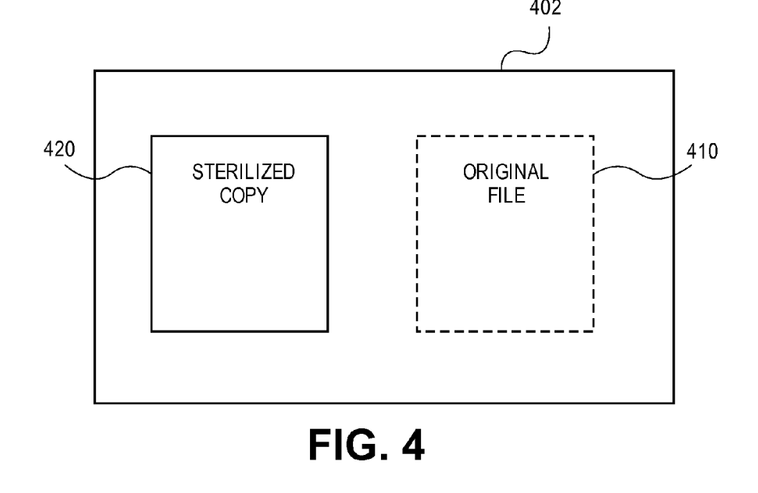
FIG. 4 is an illustration of an original data file stored in association with a sterilized file according to an embodiment.

To illustrate, consider FIG. 4, which is an illustration of original data file stored 410 in association with sterilized file 420 according to an embodiment. As depicted in FIG. 4, both original data file 410 and sterilized file 420 are stored in folder 402 of a file system. Original file 410 is depicted in a dotted line in FIG. 4 because original file 401 may have a hidden attribute which prevents original data file 410 from being viewed by a user. Thus, a user visually inspecting the contents of folder 402 would see sterilized copy 420 but may not see original file 410.

Original file 410 and sterilized copy 420 operate as linked files in that an operation performed on one of them is performed against both. For example, if a user performs a move operation on sterilized copy 420 to move sterilized copy 420 to a different location within the file system, the move operation is also automatically and transparently performed on original file 410 so that the association between sterilized copy 420 and original file 410 may be maintained. As another example, if a user attaches sterilized copy 420 to an email, then original file 410 may also become attached to the email. There are a variety of different ways to implement this behavior. For example, both sterilized copy 420 and original file 410 may be organized as a tuple and both files may separately be attached to the email. Alternatively, both sterilized copy 420 and original file 410 may be organized within and stored as a single data structure, such as a blob, and the single data structure may be attached to the email.

Performing a Merge-Edit Operation

Embodiments of the invention support the performance of a merge-edit operation. A merge-edit operation is an operation where all or a portion of a first file is embedded or copied into a second file, where the metadata and the file format data structures of the first file are copied into the second file as well. For example, assume an Excel spreadsheet contains a macro. If you wish to copy the Excel spreadsheet, along with the macro, into another document, you may do so using a merge-edit. However, if you only want to insert data or a portion of the display of the Excel spreadsheet without coping the macro or other metadata/data structures of the Excel spreadsheet, then a normal edit operation may be performed to do so.

To perform a merge-edit operation, it is necessary to have a version of a digital file that contains a high fidelity version of the metadata, file format data structures, and dynamic content of the original digital file. Therefore, as explained above, certain embodiments of the inventions may store, in association with a sterilized copy of a digital file, the original data file as well. In this way, if a merge-edit operation is desired to be performed, the merge-edit operation may be performed using the original data file which accompanies the sterilized file. Note that the presence of the original data file may be hidden from the user, and so the user requesting a merge-edit operation may be unaware that the merge-edit operation is actually performed using the original data filed stored in association with the sterilized copy.

A merge-edit operation may involve untrusted data, and as such, should be treated as an untrusted operation. As a result, in an embodiment, all merge-edit operations are ideally performed in a virtual machine or in a UCVM. Additional discussion on how this may be performed is provided in the next section.

Implementation with Virtual Machines

Embodiments of the invention may, but need not, perform one or more steps of FIG. 1 within a virtual machine. Step 110 may be performed in a virtual machine that is instantiated immediately prior to and for the purpose of the creation of the intermediate copy. The creation of the sterilized copy in step 120 may be performed within another virtual machine that is instantiated immediately prior to and for the purpose of the creation of the sterilized copy. Alternately, the creation of the sterilized copy in step 120 may be performed within the host operating system outside of any virtual machine.

Note that after the performance of step 120 of FIG. 1, the sterilized copy may be stored in a file system provided by the host operating system, and any virtual machine instantiated for the purpose of creating the intermediate copy in step 110 or the sterilized copy in step 120 may be de-instantiated.

In an embodiment, sterilized copies need not be executed within a virtual machine, but instead, may be processed using the default file handler associated with the shell extensions. On the other hand, any digital file that is not a sterilized copy (i.e., the digital file lacks a proper digital signature) must ideally be processed within a virtual machine.

In embodiments of the invention, all of the steps of FIG. 1 or any step taken with reference to FIG. 3 may be performed in a virtual machine at any location, including but not limited to any location depicted in FIG. 2, such as cloud service 230, mail gateway 222, edge router 220, PC 224, and wireless device 226.

Benefits of Embodiments

Embodiments of the invention provide numerous benefits. The steps of FIG. 1 may be performed quickly and with little to no interaction with the user if desired. The user may remain in control of what her or she views from untrusted sources. Embodiments obviate the need to identify each and every type of file format vulnerability, as 0 day malware may be automatically removed. Sterilized copies of digital files may be safely transferred across an organization, and each recipient of the sterilized file may be assured the sterilized file is safe and trustworthy due to the digital sterilized accompanying the sterilized file.

Hardware Mechanisms

Figure 5:
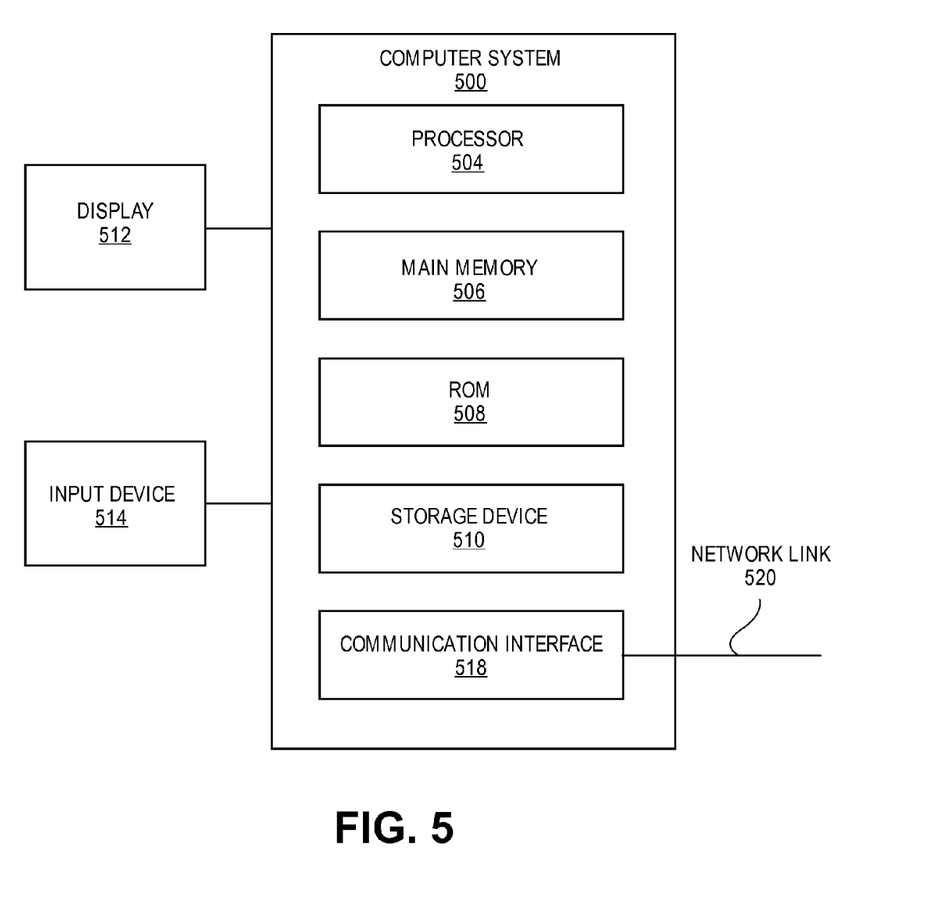
FIG. 5 is a block diagram that illustrates a computer system upon which an embodiment of the invention may be implemented.

In an embodiment, the steps of FIG. 1 may be implemented on or performed by software executing on a computer system. FIG. 5 is a block diagram that illustrates a computer system 500 upon which an embodiment of the invention may be implemented. In an embodiment, computer system 500 includes processor 504, main memory 506, ROM 508, storage device 510, and communication interface 518. Computer system 500 includes at least one processor 504 for processing information. Computer system 500 also includes a main memory 506, such as a random access memory (RAM) or other dynamic storage device, for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device for storing static information and instructions for processor 504. A storage device 510, such as a magnetic disk or optical disk, is provided for storing information and instructions.

Computer system 500 may be coupled to a display 512, such as a cathode ray tube (CRT), a LCD monitor, and a television set, for displaying information to a user. An input device 514, including alphanumeric and other keys, is coupled to computer system 500 for communicating information and command selections to processor 504. Other non-limiting, illustrative examples of input device 514 include a mouse, a trackball, or cursor direction keys for communicating direction information and command selections to processor 504 and for controlling cursor movement on display 512. While only one input device 514 is depicted in FIG. 5, embodiments of the invention may include any number of input devices 514 coupled to computer system 500.

Embodiments of the invention are related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 504 for execution. Such a medium may take many forms, including but not limited to, non-volatile media and volatile media. Non-volatile media includes, for example, optical or magnetic disks, such as storage device 510. Volatile media includes dynamic memory, such as main memory 506.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 504 for execution. For example, the instructions may initially be carried on a magnetic disk of a remote computer. The remote computer can load the instructions into its dynamic memory and send the instructions over a network link 520 to computer system 500.

Communication interface 518 provides a two-way data communication coupling to a network link 520 that is connected to a local network. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through a local network to a host computer or to data equipment operated by an Internet Service Provider (ISP).

Computer system 500 can send messages and receive data, including program code, through the network(s), network link 520 and communication interface 518. For example, a server might transmit a requested code for an application program through the Internet, a local ISP, a local network, subsequently to communication interface 518. The received code may be executed by processor 504 as it is received, and/or stored in storage device 510, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable storage mediums storing one or more sequences of instructions for reducing a security risk posed by a digital file, which when executed by one or more processors, cause:
    converting the digital file from a first format to a second format, wherein the second format is different than the first format, wherein the second format preserves a visual or audio presentation of the digital file without supporting metadata or file format data structures of the first format,
    wherein converting the digital file from the first format to the second format is performed, without user input, in response to a component determining that the digital file (a) has entered a secure area of a storage medium and (b) does not contain a digital signature from a trusted entity.

2. The one or more non-transitory computer-readable storage mediums of claim 1, wherein execution of the one or more sequences of instructions further cause:
    converting the digital file from the second format back to the first format.

3. The one or more non-transitory computer-readable storage mediums of claim 2, wherein converting the digital file from the second format back to the first format comprises inserting a digital signature into the digital file indicating that the digital file has been converted from the second format to the first format.

4. One or more non-transitory computer-readable storage mediums storing one or more sequences of instructions for reducing a security risk posed by a digital file, which when executed by one or more processors, cause:
    converting the digital file from a first format to a second format, wherein the second format is different than the first format, wherein the second format preserves a visual or audio presentation of the digital file without supporting metadata or file format data structures of the first format,
    wherein converting the digital file from the first format to the second format is performed, without user input, in response to a component determining that the digital file does not contain a digital signature from a trusted entity, wherein the component executes on or corresponds to an edge router, an email server, an email client, a web browser, software responsible for managing the instantiation and de-instantiation of one or more virtual machines, a hardware device, or an application specific integrated circuit (ASIC).

5. The one or more non-transitory computer-readable storage mediums of claim 2, wherein converting the digital file from the first format back to the second format is performed within a particular virtual machine, and wherein converting the digital file from the second format back to the first format is performed outside of the particular virtual machine.

6. The one or more non-transitory computer-readable storage mediums of claim 2, wherein execution of the one or more sequences of instructions further causes:
    prior to converting the digital file from the first format back to the second format, removing a macro from the digital file while the digital file is in the first format;
    after identifying a portion of the macro which does not conform to a rule, revising the portion of the macro to conform to the rule to produce a sterilized macro; and
    after converting the digital file from the second format back to the first format, inserting the sterilized macro back into the digital file.

7. The one or more non-transitory computer-readable storage mediums of claim 2, wherein execution of the one or more sequences of instructions further causes:
    examining a macro contained within the digital file while the digital file is in the first format; and
    after determining that the macro does not conform to a rule, causing the macro to be removed from the digital file upon converting the digital file from the second format back to the first format.

8. One or more non-transitory computer-readable storage mediums storing one or more sequences of instructions for reducing a security risk posed by a digital file, which when executed by one or more processors, cause:
    converting the digital file from a first format to a second format, wherein the second format is different than the first format, wherein the second format preserves a visual or audio presentation of the digital file without supporting metadata or file format data structures of the first format,
    wherein converting the digital file from the first format to the second format is performed, without user input, in response to a component determining that the digital file does not contain a digital signature from a trusted entity;
    converting the digital file from the second format back to the first format; and
    after converting the digital file from the second format back to the first format to produce a sterilized digital file, storing, within a file system, an original copy of the digital file in association with the sterilized digital file, wherein the original copy of the digital file is in the first format and has an attribute that hides the original copy from the user's view, and wherein the original copy of the digital file has not been converted to or from the second format.

9. The one or more non-transitory computer-readable storage mediums of claim 8, wherein a move operation performed on the sterilized digital file is also automatically and transparently performed on the original copy.

10. The one or more non-transitory computer-readable storage mediums of claim 2, wherein the steps of (a) converting the digital file from the first format to the second format and (b) converting the digital file from the second format back to the first format are performed transparently to a user.

11. The one or more non-transitory computer-readable storage mediums of claim 2, wherein execution of the one or more sequences of instructions further causes:
    preventing all files, other than files which have been converted to a different format and then back to an original format, from being processed using a default file handler associated with the shell extension of the file.

12. The one or more non-transitory computer-readable storage mediums of claim 8, wherein execution of the one or more sequences of instructions further causes:
    performing a merge-edit operation involving the sterilized digital file and a target file by (a) identifying the original copy of the digital file stored in association with the sterilized digital file and (b) copying a portion of content from the original copy of the digital file into the target file, wherein the portion of content comprises dynamic content expressed in the first format.

13. The one or more non-transitory computer-readable storage mediums of claim 1, wherein the second format is a serialized representation of the digital file.

14. The one or more non-transitory computer-readable storage mediums of claim 1, wherein the digital file is converted into the second format in a virtual machine that is instantiated immediately prior to and for the purpose of converting the digital file into the second format.

15. The one or more non-transitory computer-readable storage mediums of claim 8, wherein execution of the one or more sequences of instructions further causes:

in response to a request to perform a first type of merge operation, merging the sterilized digital file with a particular digital file to create a first merged document, wherein the first merged document does not comprise any metadata or file format data structures of the first format; and in response to a request to perform a second type of merge operation, merging the sterilized digital file with the particular digital file to create a second merged document, wherein the second merged document does comprise metadata or file format data structures of the first format.

16. One or more non-transitory computer-readable storage mediums storing one or more sequences of instructions for reducing a security risk posed by a digital file, which when executed by one or more processors, cause:

converting the digital file from a first format to a second format, wherein the second format is different than the first format, wherein the second format preserves a visual or audio presentation of the digital file without supporting metadata or file format data structures of the first format, wherein converting the digital file from the first format to the second format is performed, without user input, in response to a component determining that the digital file does not contain a digital signature from a trusted entity; and in response to a request to perform a type of merge operation, performing the steps of:
  instantiating a new virtual machine for the purpose of creating a merged document;
  merging, within the new virtual machine, a portion of the digital file with a portion of a particular digital file to create the merged document, wherein the merged document does comprise metadata or file format data structures of the first format, and
  after extracting the merged document from the new virtual machine, de-instantiating the new virtual machine.

17. An apparatus for reducing a security risk posed by a digital file, which when executed by one or more processors, comprising:

one or more processors; and
one or more non-transitory computer-readable storage mediums storing one or more sequences of instructions, which when executed, cause:
  converting the digital file from a first format to a second format, wherein the second format is different than the first format, wherein the second format preserves a visual or audio presentation of the digital file without supporting metadata or file format data structures of the first format,
  wherein creating the second format is performed, without user input, in response to a component determining that the digital file (a) has entered a secure area of a storage medium and (b) does not contain a digital signature from a trusted entity.

18. The apparatus of claim 17, wherein execution of the one or more sequences of instructions further cause:
converting the digital file from the second format back to the first format.

19. A machine-implemented method for reducing a security risk posed by a digital file, which when executed by one or more processors, comprising:

a machine executing one or more sequences of instructions to cause:
  converting the digital file from a first format to a second format, wherein the second format is different than the first format, wherein the second format preserves a visual or audio presentation of the digital file without supporting metadata or file format data structures of the first format,
  wherein creating the second format is performed, without user input, in response to a component determining that the digital file (a) has entered a secure area of a storage medium and (b) does not contain a digital signature from a trusted entity.

20. The machine-implemented method of claim 19, wherein execution by the machine of the one or more sequences of instructions further causes:
converting the digital file from the second format back to the first format.

21. The one or more non-transitory computer-readable storage mediums of claim 1, wherein converting the digital file from said first format to said second format is performed prior to receiving a request to open said digital file.

* * * * *